Feb. 22, 1966 N. S. DEYE 3,237,027

LOW-CAPACITANCE DIODE PULSE SWITCHING

Filed Jan. 31, 1963

| ELEMENT | VALUE | UNITS |
|---|---|---|
| R 12 | 20,000 | Ohms |
| R 13 | 2,000 | Ohms |
| R 15 | 10,000 | Ohms |
| R: 16, 26, 36, 46 | 33,000 | Ohms |
| C: 51, 52, 53, 54, 55 | 0.047 | Microfarads |
| CR: 18, 19, 28, 29, 38, 39, 48, 49 | 1 | Micromicrofarads |
| E 11 | −20 | Volts (D.C.) |

INVENTOR.
NEIL S. DEYE
BY [signature]
ATTORNEY

United States Patent Office 3,237,027

Patented Feb. 22, 1966

3,237,027

LOW-CAPACITANCE DIODE PULSE SWITCHING

Neil S. Deye, Columbus, Ohio, assignor to North American Aviation, Inc.

Filed Jan. 31, 1963, Ser. No. 255,361
3 Claims. (Cl. 307—88.5)

Figures 1, 2:
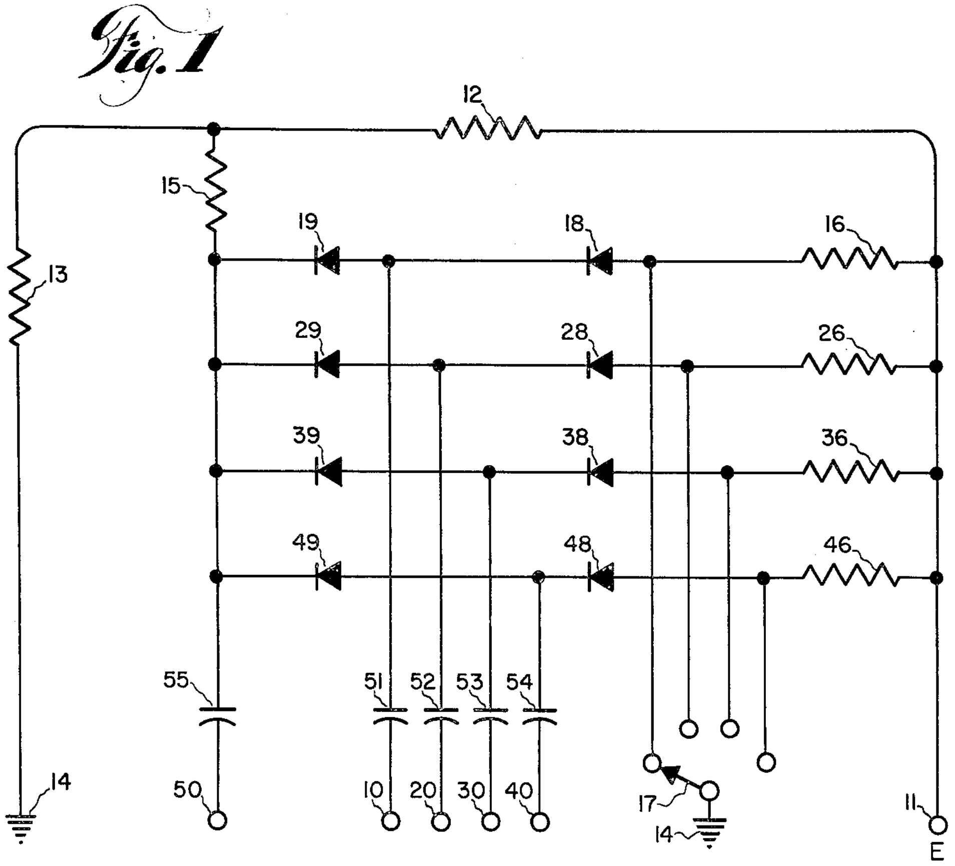

This invention concerns a pulse switch, and particularly relates to a combination of components which may be utilized to advantage to switch sequential electrical energy pulses received at one or more selected input terminals of a larger grouping of switch input terminals to a common output terminal.

In one application, this invention has been incorporated in test equipment for evaluating the performance characteristics of an aircraft radar altimeter unit. In the test equipment it is necessary to selectively switch one or more types of internal radar altimeter pulse signals, such as signals originated in the altimeter unit for blanking, triggering, video, and the like functions, to evaluation circuitry. The evaluation circuitry may perform analysis operations relating to pulse amplitude, frequency, and width relationships. In one actual embodiment, this invention has been adapted for handling six channels of input pulses; each processed pulse had characteristics in the range of from 1 to 15 volts potential (positive or negative), from 0.1 to 10 microseconds width, and repetition frequencies up to 100,000 per second.

An important object of this invention is to provide a pulse switch which is capable of switching selected received input pulses to a common output terminal without distorting the voltage amplitude-time relationship of each received pulse.

Another object of this invention is to provide a pulse switch having a capability of switching selected received electrical energy pulses at comparatively-high rates.

Another object of this invention is to provide a pulse switch characterized as having a comparatively-low operating power requirement.

Another object of this invention is to provide a pulse switch characterized as having a comparatively-fast switching response to received electrical energy input pulses.

A still further object of this invention is to provide a pulse switch which may be readily modified for use in the selective switching of electrical energy pulses having an opposite polarity potential.

Another object of this invention is to provide a pulse switch having a comparatively-low capacitance characteristic to thereby realize important advantages in the switching of high-impedance input signals.

Another object of this invention is to provide a pulse switch which obtains improved operating reliability through the elimination of moving parts such as switch contacts and the like.

Another object of this invention is to provide a pulse switch which is of comparatively-small physical size, which is of comparatively-simple construction, and which may be manufactured at comparatively-low cost.

Other objects and advantages of this invention will become apparent during consideration of the specification and drawings.

In the drawings:

FIG. 1 illustrates a preferred embodiment of the pulse switch of this invention; and FIG. 2 provides information, in tabular form, concerning a particular embodiment of the FIG. 1 pulse switch as adapted to the selective switching of positive potential electrical energy pulses in a specific application requirement.

Referring to FIG. 1, the pulse switch of this invention includes terminals 10, 20, 30, and 40 for receiving input electrical energy pulses which are to be selectively switched to the output terminal designated 50. The switch illustrated in FIG. 1 is arranged for receiving and for processing or rejecting positive potential pulses in each of four separate channels. The selection of four channels, however, is a matter of choice. This invention essentially requires a minimum of only two channels in order to be utilized for the basic objective of switching selectivity. Embodiments of the FIG. 1 pulse switch have been utilized with greater numbers of processing channels.

The pulse switch of this invention has a power terminal 11 which is coupled to a voltage divider network and which receives operating electrical energy from an external power source (not shown). The electrical energy (power) source coupled to terminal 11 is a source of direct-current energy and is selected to have a negative potential characteristic. If it is desired to process negative potential pulses through the switch, a positive potential is applied to terminal 11 and the connections to all hereinafter-mentioned diodes in the switch are reversed.

Resistors 12 and 13 are combined in series and essentially comprise the voltage divider network portion of the pulse switch of this invention. Resistor 13 is coupled to the ground reference potential designated 14. Resistor 15 functions to isolate input and output pulses processed through the switch from the voltage divider network. Resistor 16 is provided to fulfill a current-limiting function. A selector device is also provided in the invention and is connected, at one side, directly to ground reference potential level 14. A lead is connected to each channel of the switch and to the selector device 17. As shown in FIG. 1, the selector lead is connected to the switch channel at that side of current-limiting resistor 16 most distant from power terminal 11. In FIG. 1 such selector device is schematically illustrated as a manual switch. However, in practice and especially where high switching rates are involved, selector device 17 may take the form of a conventional electronic switch, a relay, a combination of relays, or the like.

Also, selector device 17 is illustrated as having a form suitable for activating (selecting) only a single channel of the switch for operation at any one time. However, two or more channels of the switch of this invention may be simultaneously operated or activated by a multi-channel selector device substituted for component 17.

As shown in FIG. 1, the switch channel coupled to current-limiting resistor 16 and isolated from the voltage divider network by resistor 15 includes diodes (crystal rectifiers) 18 and 19. The anode of diode 18 is connected to resistor 16 and to the selector lead which is coupled to selector device 17. The anode of diode 19 is also connected to that input lead and has its cathode connected to resistor 15 and to the output lead associated with terminal 50. Blocking capacitors 51 and 55 are included in the input and output leads at either side of diode 19. A similar arrangement exists with respect to the other switch channels identified in part by current-limiting resistors 26, 36, and 46, respectively. Each additional switch channel includes a selector lead to selector device 17, an input lead to one of terminals 20, 30, or 40, and a connection to the output coupled to terminal 50. Diodes 28, 29, 38, 39, and 48, 49 are similar to diodes 18, 19. Capacitors 52, 53, and 54 also serve a direct-current blocking function. If desired, a resistor may be substituted for any or each of diodes 18, 28, 38, and 48. The advantages of substitution is largely reduced initial costs.

Operation of the switch may be adequately described by detailed reference to two of the illustrated switch channels, the switch being connected to equipment (e.g., a radar altimeter unit) generating the input signals and to operationally coupled equipment (e.g., test equipment) receiving the switch output signals from terminal 50. For this purpose, an operating description will be developed on the basis of the two switch channels associated with input terminals 10 and 20. Also, operation of the switch will be described with reference to a negative potential direct-current electrical energy source coupled to power terminal 11. This arrangement is intended for applications requiring the selective processing and rejecting of electrical energy pulses having a positive potential and received at input terminals 10 and 20. With single-channel selector device 17 in the position shown, the anode of diode 18 is at a ground potential 14. The cathode of diode 19 is at a negative potential determined in part by resistors 12 and 13 of the voltage divider network and in-part by resistor 15. Diodes 18 and 19 are forward-biased and an electrical energy pulse of positive potential coupled to input terminal 10 will permit conduction of a pulse (current) from output terminal 50 and through diode 19. Diodes 28 and 29 in the other channel of the pulse switch are reverse-biased in an amount determined by the potential at terminal 11 minus the forward-bias voltage of resistors 12 and 13. Thus, any positive pulse coupled to input terminal 20 will be turned off, i.e., will not permit conduction of a pulse (current) from output terminal 50 and through diode 29 to terminal 20. The reverse-bias for diodes 28 and 29 should always exceed the maximum peak amplitude of all input pulses received by the switch. No power is expended in those channels of the switch not activated by a ground connection through selector device 17, and no signals are switched or rejected in the inactive channels. Diode junction capacitance is reduced from normal by maintaining the reverse-bias during such time as the diodes are in an off (non-conducting state). If it is required that the switch be utilized to transfer input pulses having a negative potential characteristic from the various input terminals to output terminal 50 on a selective basis, it is only necessary to change the polarity of the power source at terminal 11 to a positive potential and to reverse the connections shown to each diode. The modified switch will operate in the manner discussed above and will obtain the same performance advantages.

FIG. 2 provides tabular information concerning a particular embodiment of the FIG. 1 pulse switch arrangement. The indicated values were selected to provide a capability for switching input pulses having a peak potential of from 1 volt to 15 volts, having a width or time duration of from 0.1 to 10 microseconds, and having a pulse repetition frequency up to 5,000 per second. Such circuit was employed in connection with the analysis and measurement of numerous different output pulse signals generated within an aircraft radar altimeter unit. The various switch circuit components are considered to be of conventional design. The diodes were silicon crystal rectifiers selected for the application at hand. The diodes are identified in the FIG. 2 table only as having a capacitance value of 1 micromicrofarad. However, the diodes may also be described as having a fast rise time. The selection of particular diode components of the switch is considered to be within the capability of those who are skilled in the art and who have an understanding of the objectives to be obtained.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

I claim:

1. A low-capacitance switch for conducting electrical energy pulses of a given polarity from one of different switch input terminals to a switch output terminal without conducting electrical energy pulses of a like polarity from other of the different switch input terminals, and comprising:

(a) a common switch output terminal,
(b) voltage divider network means connected to said output terminal and having a direct-current electrical energy supply with a polarity opposite to said pulse given polarity,
(c) parallel switching channels each connected to said output terminal in parallel relation to said voltage divider network means and each connected to a different one of the different switch input terminals,
(d) low-capacitance rectifier diode means in each of said parallel switching channels in intermediate relation to said output terminal and to a different one of the different switch input terminals, and
(e) selector means for causing electrical energy pulses from a selected one of the different switch input terminals only to be conducted by the switch, said selector means forward-biasing said rectifier diode means into a conducting condition in the one of said parallel switching channels connected to the selected one of the different switch input terminals, and said rectifier diode means being reverse-biased by said voltage divider network means into a non-conducting condition in each other of said parallel switching channels.

2. In a multi-channel low-capacitance switch for selectively conducting electrical energy pulses from a selected one of multiple input terminals to a common output terminal without conducting electrical energy pulses from the other of said multiple input terminals:

(a) parallel pulse-processing channels each connected to a different one of the input terminals and each connected to the switch common output terminal,
(b) rectifier diode means in each of said channels in conduction-controlling relation to the common output terminal and the input terminal connected thereto, and
(c) selector means forward-biasing said rectifier diode means into a conducting condition in channels selected for transferring electrical energy pulses to said output terminal, said rectifier diode means being reverse-biased into a non-conducting condition in the remainder of said parallel pulse-processing channels.

3. A low-capacitance switch for conducting electrical energy pulses of a given polarity from one of different switch input terminals to a switch output terminal without conducting electrical energy pulses of a like polarity from other of the different switch input terminals, and comprising:

(a) a common switch output terminal,
(b) voltage divider network means connected to said output terminal and having a direct current electrical energy supply with a polarity opposite to said pulse given polarity,
(c) parallel switching channels each connected to said output terminal in parallel relation to said voltage divider network means and each cooperating with a different one of the different switch input terminals,
(d) series-connected first and second low-capacitance rectifier diode means in each of said parallel switching channels biased in a like direction,
(e) first lead means connected to each of said parallel switching channels intermediate said first and second diode means and connected to a different one of the different input terminals,
(f) second lead means connected to each of said parallel switching channels intermediate said series-connected diode means and said voltage divider network means in current-limited relation, and
(g) selector means selectively connecting said second lead means to a bias-changing potential to cause electrical energy pulses from a selected one of the different switch input terminals only to be conducted by the switch, said selector means forward-biasing said rectifier diode means into a conducting condition in the one of said parallel switching channels connected to the one of the different switch input terminals selected by said selector means, and said rectifier diode means being reverse-biased by said voltage divider network means into a non-conducting condition in the other of said parallel switching channels.

References Cited by the Examiner

UNITED STATES PATENTS

| | | | |
|---|---|---|---|
| 2,535,303 | 12/1950 | Lewis | 307—88.5 |
| 3,167,730 | 1/1965 | Anderson et al. | 307—88.5 |

MILTON O. HIRSHFIELD, *Primary Examiner.*